United States Patent [19]

Nakajima et al.

[11] Patent Number: 5,471,329
[45] Date of Patent: Nov. 28, 1995

[54] ACTIVE MATRIX TYPE LIQUID CRYSTAL DISPLAY PANEL AND A METHOD FOR PRODUCING THE SAME, HAVING A CONSTRUCTION CAPABLE OF PREVENTING BREAKDOWN OF THE SWITCHING ELEMENTS OR DETERIORATION DUE TO STATIC ELECTRICITY

[75] Inventors: Mutsumi Nakajima; Nobuyoshi Nagashima; Kyoushi Tanaka, all of Tenri, Japan

[73] Assignee: Sharp Kabushiki Kaisha, Osaka, Japan

[21] Appl. No.: 171,235

[22] Filed: Dec. 21, 1993

[30] Foreign Application Priority Data

Dec. 21, 1992 [JP] Japan ..................... 4-340778

[51] Int. Cl.[6] ............................................. G02F 1/1343
[52] U.S. Cl. ................................................ 359/54; 359/59
[58] Field of Search .................................. 359/54, 55, 59; 257/59, 72

[56] References Cited

U.S. PATENT DOCUMENTS

| 5,068,748 | 11/1991 | Ukai et al. | 359/59 |
| 5,184,235 | 2/1993 | Sukegawa | 359/54 |
| 5,264,728 | 11/1993 | Ikeda et al. | 257/412 |
| 5,313,319 | 5/1994 | Salisbury | 359/59 |

FOREIGN PATENT DOCUMENTS

| 0369828 | 5/1990 | European Pat. Off. . |
| 0423824 | 4/1991 | European Pat. Off. . |
| 62-58226 | 3/1987 | Japan . |
| 3-134628 | 6/1991 | Japan . |

OTHER PUBLICATIONS

Patent Abstracts of Japan, vol. 11, No. 252 (P-605) 15 Aug. 1987.

*Primary Examiner*—Anita Pellman Gross
*Assistant Examiner*—James A. Dudek
*Attorney, Agent, or Firm*—David G. Conlin; Kevin J. Fournier

[57] ABSTRACT

An active matrix type liquid crystal display panel including a first and a second insulating substrates which face each other is disclosed. The first insulating substrate includes: first bus lines formed on a face of the first insulating substrate, the face facing the second insulting substrate; second bus lines crossing the first bus lines; a short-circuit line for short-circuiting the first bus lines to the second bus lines, the short-circuit line crossing the first bus lines at end portions thereof and crossing the second bus lines at end portions thereof; and a plurality of elements for electrically connecting the short-circuit line to one of the first bus lines and the second bus lines, the elements being respectively formed at the crossings of the short-circuit line and the first bus lines and at the crossings of the short-circuit line and the second bus lines. Each of the elements includes: part of a corresponding one of the end portions of the first bus lines or part of a corresponding one of the end portions of the second bus lines; a corresponding part of the short-circuit line; and an insulating thin film formed between the short-circuit line and the corresponding one of the end portions of the first bus lines or the corresponding one of the end portion of the second bus lines.

20 Claims, 2 Drawing Sheets

ACTIVE MATRIX TYPE LIQUID CRYSTAL DISPLAY PANEL AND A METHOD FOR PRODUCING THE SAME, HAVING A CONSTRUCTION CAPABLE OF PREVENTING BREAKDOWN OF THE SWITCHING ELEMENTS OR DETERIORATION DUE TO STATIC ELECTRICITY

BACKGROUND OF THE INVENTION

1. Field of the Invention

The present invention relates generally to an active matrix type liquid crystal display panel as is indicated. In particular, the present invention relates to an active matrix type liquid crystal display panel having a construction capable of preventing breakdown of the switching elements or deterioration of the characteristics thereof due to static electricity or the like which can arise in the production process. The invention also relates to a method for producing such an active matrix type liquid crystal display panel.

2. Description of the Related Art

FIG. 3 shows the equivalent circuit of a conventional active matrix type liquid crystal display panel. As is known, such a conventional liquid crystal display panel generally includes an active matrix substrate serving as a first insulating substrate, a counter substrate serving as a second insulating substrate, and a liquid crystal layer which serves as a display medium. The active matrix substrate and the counter substrate are positioned so as to face each other with the liquid crystal layer interposed therebetween. As shown in FIG. 3, the liquid crystal display panel also includes counter electrodes 39 which are formed on almost the entire surface of the counter substrate on the side facing the display medium. On the surface of the active matrix substrate on the side facing the display medium, gate bus lines 31 serving as scanning lines and source bus lines 32 serving as signal lines are so located that the gate bus lines 31 intersect the source bus lines 32. In each of the areas surrounded by the gate bus lines 31 and the source bus lines 32, a thin film transistor (hereinafter referred to as a "TFT") 33 functioning as a switching element and a pixel electrode 38 are provided.

The TFT 33 is connected to the gate bus line 31, source bus line 32 and pixel electrode 38 as shown. The TFT 33 receives a gate signal transmitted through the gate bus line 31, and is turned on or off in accordance with the received gate signal. When the TFT 33 is turned on, it receives a source signal transmitted through the source bus line 32, and transfers the received source signal to the pixel electrode 38. The pixel electrodes 38 formed on the active matrix substrate are positioned so as to face respectively the above-mentioned counter electrodes 39 formed on the counter substrate, with the liquid crystal layer interposed therebetween. Each pixel electrode 38, the counter electrode 39 corresponding thereto, and the portion of the liquid crystal layer interposed therebetween form a liquid crystal cell 34 which functions as a capacitor.

The liquid crystal display panel further includes a short-circuit line 36 and non-linear elements 37 formed on the active matrix substrate. The short-circuit line 36 is connected to an end of each gate bus line 31 and also to an end of each source bus line 32 by way of a corresponding non-linear element 37. The non-linear element 37 functions as an element having low resistance when static electricity arises, so that electric charges of the static electricity are diffused through the short-circuit line 36. Due to such diffusion, electric potentials of the gate bus line 31 and the source bus line 32 become equal to each other. As a result, breakdown of the TFTs 33 or deterioration of the characteristics thereof due to the static electricity arising in the production process of the liquid crystal display panel can be prevented. The non-linear element 37 used in this conventional liquid crystal display panel is composed of, for example, a TFT.

The reason for providing the non-linear elements 37 is as follows. In cases where the short-circuit line 36 is directly connected to the gate bus lines 31 and source bus lines 32 without using the non-linear elements 37, it is necessary to cut or otherwise remove the peripheral portions of the liquid crystal display panel in order to remove the short-circuit line 36 therefrom after the production of the liquid crystal display panel has been completed. The removal of the short-circuit line 36 after production of the liquid crystal display panel is disadvantageous, however, in that the liquid crystal display panel without the short-circuit line 36 is exposed to static electricity in subsequent processes such as inspection of the liquid crystal display panel, assembly of an apparatus using the liquid crystal display panel, and the like. Since the short-circuit line 36 functions to protect the TFTs 33 (switching elements) from static electricity as described above, the switching elements in the liquid crystal display panel without such short-circuit line are easily broken down or deteriorated by static electricity in the above-mentioned inspection and assembly processes.

To solve this problem, the conventional liquid crystal display panel shown in FIG. 3 uses the non-linear elements 37 which eliminate the necessity of removing the short-circuit line 36 from the liquid crystal display panel after the production thereof. Even when the liquid crystal display panel is exposed to static electricity in the above-mentioned inspection and assembly processes, the short-circuit line 36 which remains therein prevents breakdown or deterioration of the TFTs 33 due to such static electricity. Therefore, the conventional liquid crystal display panel is advantageous in that breakdown of the switching elements or deterioration of the characteristics thereof due to static electricity can be prevented during both the production process and the subsequent inspection and assembly processes.

With such a conventional liquid crystal display panel, however, since the non-linear elements 37 are composed of TFTs or the like as described above, additional production steps are required for the fabrication of the non-linear elements 37. For example, an etching process is required to provide through holes for the TFTs. Accordingly, the entire production process of the liquid crystal display panel becomes complicated. Furthermore, because each non-linear element consists of a TFT there is a greater possibility that a charge leak will occur in the non-linear element 37 to cause a defect in the liquid crystal display panel.

SUMMARY OF THE INVENTION

The active matrix type liquid crystal display panel of this invention includes a first and a second insulating substrates which face each other, the first insulating substrate including: first bus lines formed on a face of the first insulating substrate, the face facing the second insulting substrate; second bus lines crossing the first bus lines; a short-circuit line for short-circuiting the first bus lines to the second bus lines, the short-circuit line crossing the first bus lines at end portions thereof and crossing the second bus lines at end portions thereof; and a plurality of elements for electrically connecting the short-circuit line to one of the first bus lines and the second bus lines, the elements being respectively formed at the crossings of the short-circuit line and the first bus lines and at the crossings of the short-circuit line and the second bus lines, wherein each of the elements includes: part of a corresponding one of the end portions of the first bus lines or part of a corresponding one of the end portions of the second bus lines; a corresponding part of the short-circuit line; and an insulating thin film formed between the short-circuit line and the corresponding one of the end portions of the first bus lines or the corresponding one of the end portion of the second bus lines.

In one embodiment, the insulating thin film is an oxide film formed by anodizing the corresponding one of the end portions of the first bus line or the corresponding one of the end portions of the second bus lines.

In another embodiment, the end portions of the second bus lines are made of the same material as that of the first bus lines, and remaining portions of the second bus lines other than the end portions thereof are made of the same material as that of the short-circuit line.

In another embodiment, the first bus lines and the end portions of the second bus lines are made of Ta or Al.

In another embodiment, the remaining portions of the second bus lines other than the end portions thereof and the short-circuit line are made of Ti or Cr.

In another embodiment, the short-circuit line has a first portion parallel to the first bus lines and a second portion parallel to the second bus lines, and the insulating thin film is an oxide film formed by anodizing a surface of the corresponding one of the end portions of the first bus line or a surface of the first portion of the short-circuit line.

In another embodiment, the first portion of the short-circuit line is made of the same material as that of the first bus lines, and second portion of the short-circuit line is made of the same material as that of the second bus lines, and wherein the second portion of the short-circuit line and the second bus lines are provided on the first portion of the short-circuit line and the first bus lines.

In another embodiment, the first bus lines and the first portion of the short-circuit line are made of Ta or Al.

In another embodiment, the second bus lines and the second portion of the short-circuit line are made of Ti or Cr.

According to another aspect of the invention, a method for producing an active matrix type liquid crystal display panel including a first and a second insulating substrates which face each other is provided. The method includes a process for producing the first insulating substrate, the process including the steps of: forming first bus lines on a face of the first insulating substrate, the face facing the second insulting substrate; forming second bus lines crossing the first bus lines, the second bus lines being electrically insulated from the first bus lines; and forming a short-circuit line for short-circuiting the first bus lines to the second bus lines, the short-circuit line crossing the first bus lines in end portions thereof and crossing the second bus lines in end portions thereof, wherein the step of forming a short-circuit line includes a step of forming elements by forming insulating thin films on the end portions of the first bus lines and on the end portions of the second bus lines and by forming the short-circuit line to cover the insulating thin films, each of the elements including part of corresponding one of the end portions of the first bus lines or part of a corresponding one of the end portions of the second bus lines; a corresponding part of the short-circuit line; and a corresponding one of the insulating thin films.

In one embodiment, the step for forming elements includes a step of anodizing surfaces of the end portions of the first bus line or surfaces of the end portions of the second bus lines, thereby forming the insulating thin films.

In another embodiment, the step of forming second bus lines includes a step of forming the second bus lines of the same material as that of the first bus lines.

In another embodiment, the first bus lines and the end portions of the second bus lines are made of Ta or Al.

In another embodiment, the short-circuit line is made of the same material as that of remaining portions of the second bus lines other than the end portions thereof.

In another embodiment, the short-circuit line and the remaining portions of the second bus lines other than the end portions thereof are made of Ti or Cr.

According to another aspect of the invention, a method for producing an active matrix type liquid crystal display panel including a first and a second insulating substrates which face each other is provided. The method includes a process for producing the first insulating substrate, the process including the steps of: forming first parallel lines including first bus lines and a first short-circuit line on a face of the first insulating substrate, the face facing the second insulting substrate; forming insulating thin films on the first lines by anodizing surfaces of the first lines; and forming second parallel lines including second bus lines and a second short-circuit line on the insulating thin films, the second lines crossing the first lines.

According to another aspect of the invention, a method for producing an active matrix type display panel is provided. The method includes the steps of: forming a plurality of one of scanning lines and signal lines, and forming at least an end portion for each of a plurality of the other of the scanning lines and the signal lines; forming an insulating film on at least a part of each of the plurality of one of the scanning lines and the signal lines and each of the end portions of the other of the scanning lines and the signal lines; and forming a short-circuit line on the insulating film on each of the parts while forming a remaining portion of each of the plurality of the other of the scanning lines and the signal lines.

Thus, the invention described herein makes possible the advantages of (1) providing an active matrix type liquid crystal display panel including a non-linear element for allowing a short-circuit line to remain in the liquid crystal display panel after the production thereof, whereby the non-linear element can be formed without requiring additional production steps, and can be made substantially free from defects of the non-linear elements, thereby significantly reducing the possibility of causing defects in the liquid crystal display panel; and (2) providing a method for producing such an active matrix type liquid crystal display panel.

These and other advantages of the present invention will become apparent to those skilled in the art upon reading-and understanding the following detailed description with reference to the accompanying figures.

DESCRIPTION OF THE PREFERRED EMBODIMENTS

The invention will be described in detail with reference to the following example.

Figure 1:
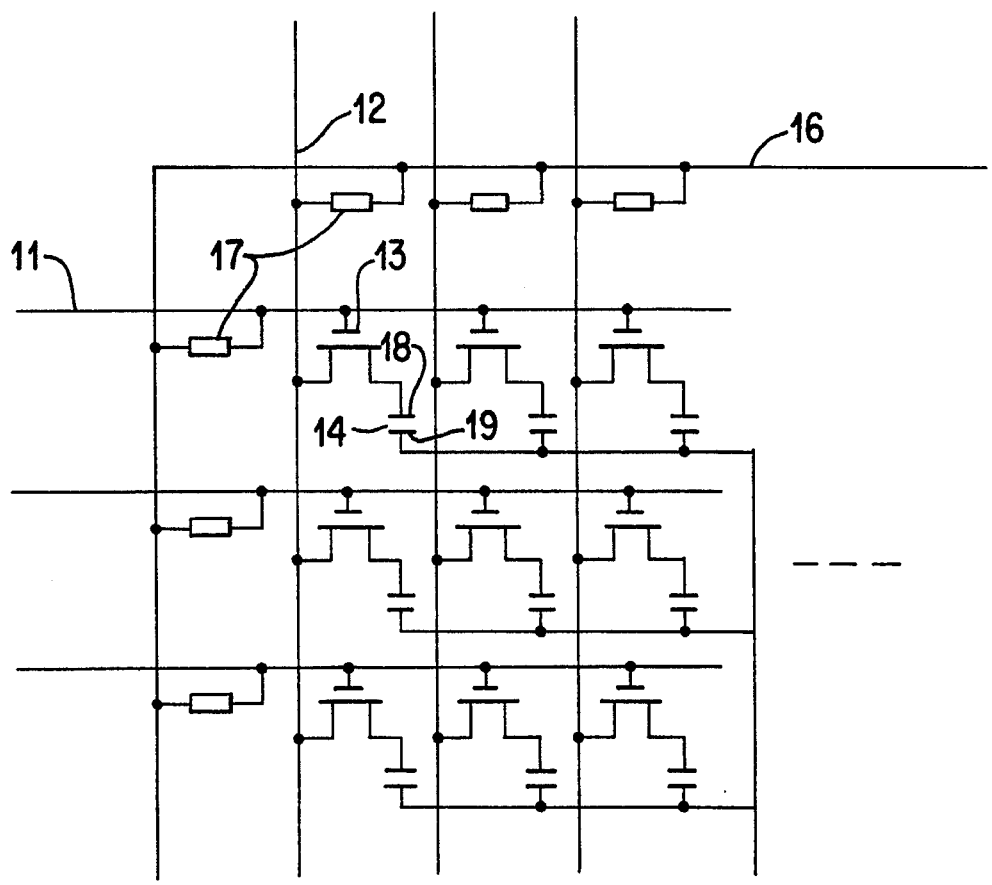
FIG. 1 is a schematic diagram showing an active matrix type liquid crystal display panel according to the present invention.
Figure 2:
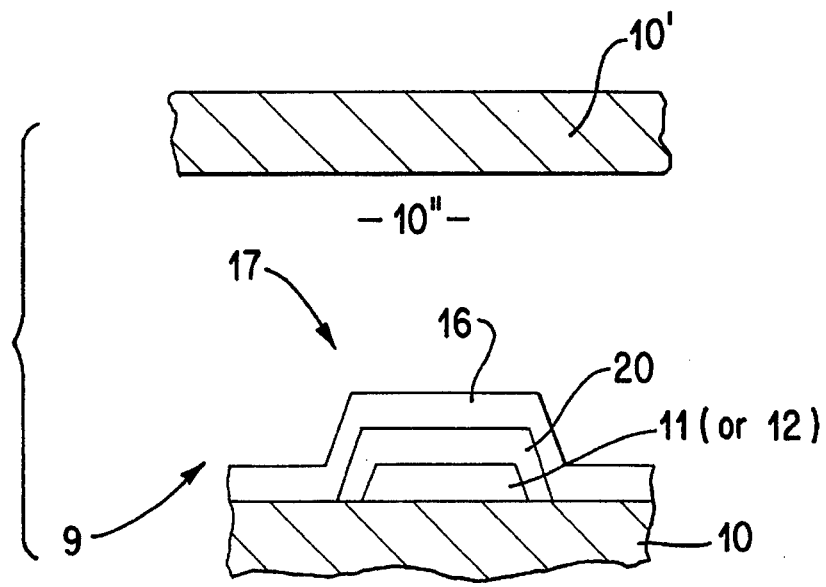
FIG. 2 is a simplified partial sectional view showing an MIM element provided in the active matrix type liquid crystal display panel of FIG. 1.
Figure 3:
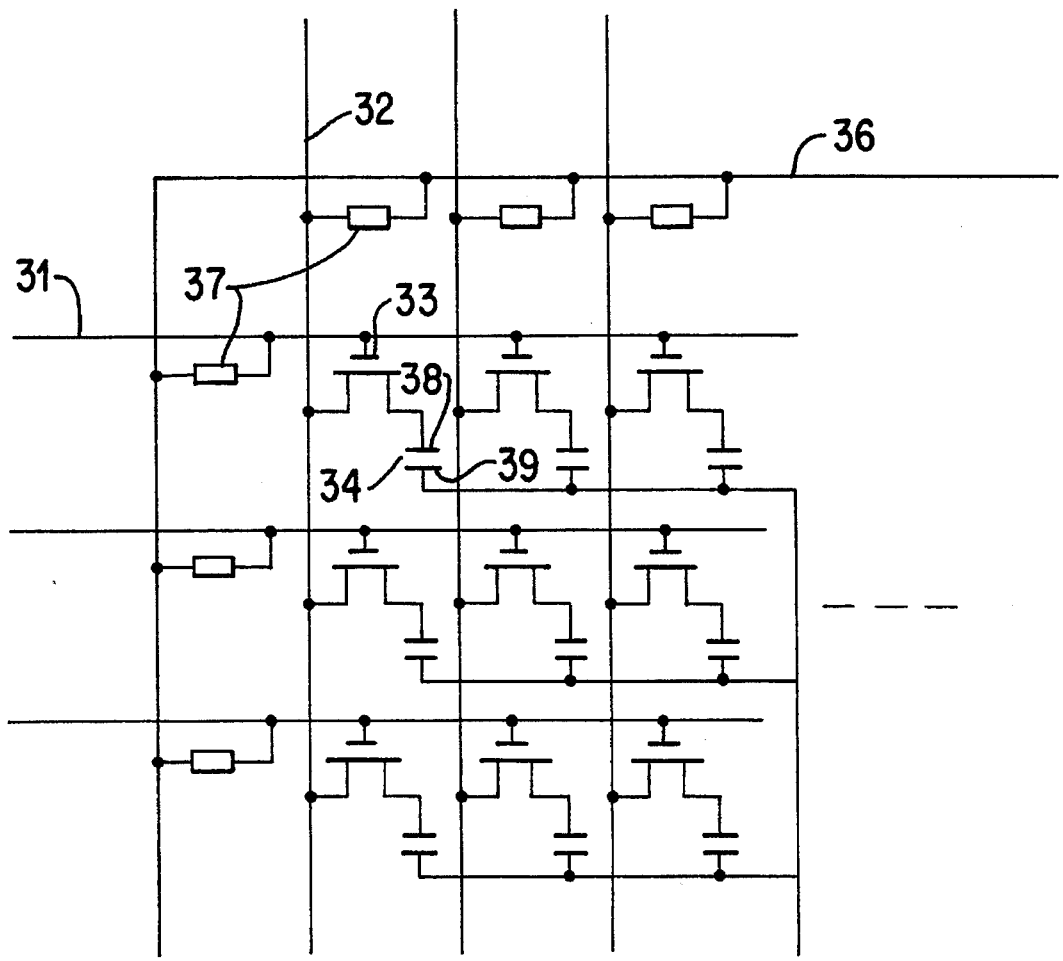
FIG. 3 is an equivalent circuit of a conventional active matrix type liquid crystal display panel.

FIGS. 1 and 2 show an example of the active matrix type liquid crystal display panel according to the present invention. Referring to FIG. 2, the liquid crystal display panel includes an active matrix substrate 9 including a first insulating substrate 10, a counter substrate 10' serving as a second insulating substrate, and a liquid crystal layer 10" which serves as a display medium. The active matrix substrate 9 and the counter substrate 10' are positioned so as to face each other with the liquid crystal layer 10" interposed therebetween as shown in FIG. 2. On substantially the entire surface of the counter substrate 10' on the side facing the display medium, counter electrodes 19 (FIG. 1) are formed. The active matrix substrate 9 includes the insulating substrate 10 which serves as a base. On the insulating substrate 10, gate bus lines 11 serving as scanning lines and source bus lines 12 serving as signal lines are so positioned that the gate bus lines 11 intersect the source bus lines 12 as is shown in FIG. 1. In each of the areas surrounded by the bus lines 11 and 12, a TFT 13 and a pixel electrode 18 are provided.

The above-mentioned TFT 13 is connected to the gate bus line 11, source bus line 12 and pixel electrode 18. The TFT 13 receives a gate signal transmitted through the gate bus line 11, and is turned on or off in accordance with the received gate signal. When the TFT 13 is turned on, it receives a source signal transmitted through the source bus line 12, and supplies the source signal to the pixel electrode 18. The pixel electrodes 18 formed on the active matrix substrate are positioned so as to face respectively the above-mentioned counter electrodes 19 formed on the counter substrate, with the liquid crystal layer interposed therebetween. Each pixel electrode 18, the counter electrode 19 corresponding thereto, and the portion of the liquid crystal layer interposed therebetween form a liquid crystal cell 14 which functions as a capacitor.

The liquid crystal display panel also includes a short-circuit line 16 which is positioned so as to cross an end portion of each gate bus line 11 and also to cross an end portion of each source bus line 12 as shown in FIG. 2. The short-circuit line 16 functions to prevent breakdown of the TFTs 13 or deterioration of the characteristics of the TFTs 13 due to static electricity which can arise in the production process of the liquid crystal display panel. Metal-insulator-metal (hereinafter, referred to as MIM) elements 17, functioning as non-linear elements, are respectively provided between the short-circuit line 16 and the end portions of each of the gate bus lines 11, and between the short-circuit line 16 and the end portions of each of the source bus lines 12, in order to connect the short-circuit line 16 to the respective gate bus line 11 and source bus line 12.

FIG. 2 is a sectional view showing the MIM element 17. In this example, the MIM element 17 is positioned at each of the crossings of the short-circuit line 16, and the end portions of the gate bus lines 11 and the end portions of the source bus lines 12 on the above-mentioned insulating substrate 10. As shown in FIG. 2, the MIM element 17 consists of an end portion of the respective bus line (11 or 12), an overlapping portion of the short-circuit line 16, and an insulating, thin film 20 interposed therebetween. In this example, the end portions of the source bus lines 12 are made of the same material as that of the gate bus lines 11. The short-circuit line 16 is made of the same material as that of the remaining portions of the source bus lines 12 other than the end portions.

The MIM element 17 in FIG. 2 is formed as follows. First, on the insulating substrate 10 made of glass or the like, gate bus lines 11 and end portions of source bus lines 12 with a thickness of 300 nm were formed of Ta by a known method. During this process, gate electrodes for the TFTs 13 (FIG. 1) were also formed on the insulating substrate 10 by a known method. Then, the surfaces of the end portions of the gate bus lines 11 and the end portions of the source bus lines 12 on which the short-circuit line 16 would be formed later were anodized to form an oxide film thereon. Similarly, the surfaces of portions of the gate bus lines 11 which were to be overlapped by the remaining portions of the source bus lines 12 formed later were anodized, thereby forming an oxide film thereon. In this example, the surfaces of the above-mentioned portions were anodized in citric acid with 150 V bias to obtain Ta oxide ($Ta_2O_5$) films with a thickness of 300 nm. Among the thus obtained oxide films, the oxide films formed on the end portions of the gate bus lines 11 and on the end portions of the source bus lines 12 become the insulating thin films 20 shown in FIG. 2. Next, on the insulating thin films 20 which were formed on the respective end portions of bus lines 11 and 12, the short-circuit line 16 of Ti having a thickness of 300 nm was formed so as to cover partially the insulating thin films 20 by a known method. At the same time, the remaining portions of the source bus lines 12 other than the end portions thereof were formed of Ti so as to cross the gate bus lines 11. As a result, at each of the crossings of the short-circuit line 16, and the gate bus lines 11 and the source bus lines 12, the MIM element 17 of a $Ta/Ta_2O_5/Ti$ structure was obtained. According to the invention, it is not necessary to anodize only the desired portions of the gate bus lines 11; the entire surfaces of the gate bus lines 11 can be subjected to anodization. In the above-mentioned anodization process, the surfaces of the gate electrodes for the TFTs 13 were also anodized, resulting in an oxide film. The oxide film thus obtained functions as, for example, a gate insulating film.

The MIM element of the above-mentioned $Ta/Ta_2O_5/Ti$ structure allows a current of only 10 μA to flow therethrough when a voltage of 30 V or less is applied thereto (i.e., across the short-circuit line 16 and the respective bus line 11 or 12). In contrast, when a high voltage of 100 V or more is applied to the MIM element, the level of the current flowing therethrough increases by about 3 orders of magnitude. This indicates that the MIM element functions as a non-linear element. Therefore, in the liquid crystal display panel including such MIM elements 17 provided at each of the crossings of the gate bus lines 11 and the short-circuit line 16 and at each of the crossings of the source bus lines 12 and the short-circuit line 16, the resistance between the Ta and Ti layers of the MIM element 17 becomes about 1 megohm (MΩ) or more when a normal driving voltage of about 30 V or less is applied to the gate bus lines 11 or source bus lines 12. Thus, in the normal operation of the liquid crystal display panel, the resistance of the MIM elements 17 is large enough to prevent the short-circuit line 16 from affecting the transmission of driving signals through the gate bus lines 11 or source bus lines 12. On the other hand, when a high voltage of about 100 V or more is applied to the MIM element 17 due to static electricity, the resistance between the Ta and Ti layers thereof decreases to about several hundred kilohms or less, thereby allowing the short-circuit line 16 to short-circuit the respective gate bus lines 11 and the source bus lines 12. As a result, electric charges of the static electricity are diffused through the short-circuit line 16, so that the electric potentials of the gate bus lines 11 and the source bus lines 12 become equal to each other. Thus, the breakdown of TFTs 13 and the deterioration of characteristics thereof can be prevented from occurring.

According to the invention, the MIM elements 17 having such characteristics and the short-circuit line 16 are formed on the active matrix substrate as described above, and are allowed to remain in the liquid crystal display panel after the production thereof. In this liquid crystal display panel, if static electricity arises and accordingly generates a high voltage between the gate bus line 11 and the source bus line 12, the resistance of the MIM element 17 becomes small as described above. When the MIM element 17 has such a small resistance, it functions as a low-resistance element which electrically connects the short-circuit line 16 to the gate bus lines 11. As a result, electric charges of the static electricity applied through the gate bus line 11 or source bus line 12 to the MIM element 17 are diffused through the MIM element 17 into the short-circuit line 16. This makes it possible to prevent breakdown of the TFTs 13 or deterioration of the characteristics of the TFTs 13 due to such static electricity. On the other hand, in the normal operation of the liquid crystal display panel, the resistance of the MIM elements 17 is large enough to prevent the short-circuit line 16 from affecting the transmission of driving signals through the gate bus lines 11 and source bus lines 12, as described above. This means that the presence of the MIM elements 17 prevents the short-circuit line 16 from exerting any influence on the display characteristics of the liquid crystal display panel. For this reason, the short-circuit line 16 need not be removed from the liquid crystal display panel after the production thereof. Since the short-circuit line 16 and MIM elements 17 are allowed to remain in the completely-fabricated liquid crystal display panel, the switching elements thereof can be prevented from being broken down or deteriorated by static electricity during an assembly process using this display panel.

The use of anodization for the formation of the insulating thin films 20 of the MIM elements 17 allows each resultant insulating thin film 20 to have very few pinholes, and also attains a high degree of uniformity in the insulating properties thereof. The anodization is, as described above, conventionally used to form insulating thin films for preventing short circuits from occurring in the TFTs 13 or at the crossings of the gate bus lines 11 and the source bus lines 12. Therefore, the formation of the MIM elements 17 does not require any additional production steps. Furthermore, the above-described simple structure of the MIM element 17 substantially eliminates the possibility of causing a short circuit therein, so that the short-circuit line 16 can be made substantially free from defects due to short circuits in the MIM elements 17.

In the above-described example, the gate bus lines 11 and the end portions of the source bus lines 12 are first formed of the same material on the insulating substrate 10, and then the surfaces of the end portions of the gate bus lines 11 and the end portions of the source bus lines 12 are anodized to form oxide films thereon, and thereafter the short-circuit line 16 is so formed as to cover the oxide films. In this manner, the MIM elements 17 can be obtained at each of the crossings of the gate bus lines 11 and the short-circuit line 16 and at each of the crossings of the source bus lines 12 and the short-circuit line 16.

Alternatively, another active matrix liquid crystal display panel with the same effects can be obtained, for example, by the following manner. First, the gate bus lines 11 and a first portion of the short-circuit line 16 parallel to the gate bus line 11 are formed of the same material on the insulating substrate 10. The surfaces of the gate bus lines 11 and the portion of the short-circuit line 16 are anodized to form oxide films thereon. Thereafter, the source bus lines 12 and a second portion of the short-circuit line 16 electrically connected to the first portion and parallel to the source bus lines 12 are formed of the same material so as to cover the oxide films. In this manner, the MIM elements 17 can be obtained at each of the crossings of the gate bus lines 11 and the second portion of the short-circuit line 16 and at each of the crossings of the source bus lines 12 and the first portion of the short-circuit line 16. Alternatively, the formation of the source bus lines 12 and the second portion of the short-circuit line 16 may be performed prior to the formation of the gate bus lines 11 and the first portion of the short-circuit line 16. It will be appreciated that an MIM element having a different shape and/or construction from that of the MIM elements described in the above examples can be formed at each of the crossings of the gate bus lines 11 or source bus lines 12 and the short-circuit line 16 and can attain the same effects as in the above example.

The materials of the gate bus lines 11, the source bus lines 12 and the short-circuit line 16 can be selected so as to ensure effectively the function of the MIM element 17. For example, Ta, Al, or the like can be used for the material of the lines which are formed on the insulating substrate 10 and are anodized to form oxide films on the surfaces thereof, and Ti, Cr, or the like can be used for the material of the lines which are formed on the oxide films formed by the anodization.

As described above, according to the invention, defects caused by static electricity, such as line defects, can be prevented from arising in the liquid crystal display panel during both the production process and the subsequent assembly process using the produced liquid crystal display panel. Furthermore, the MIM elements, which function as non-linear elements for connecting the short-circuit line to the gate or source bus lines, can be formed by the use of anodization usually used for the formation of insulating films at the crossings of the gate bus lines and the source bus lines. Therefore, the formation of the MIM elements does not require additional production steps, so that an active matrix type liquid crystal panel including a short-circuit line and MIM elements therein can readily be produced by a simplified production process. Furthermore, the use of anodization for the formation of insulating thin films allows each resultant insulating thin film to have very few pinholes and also attains a high degree of uniformity in the insulating properties thereof. Thus, the short-circuit line can be made substantially free from defects due to short circuits caused by pinholes in the insulating thin films. For the above-described reasons, according to the invention, active matrix type liquid crystal display panels can be produced with a higher yield.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix type liquid crystal display panel comprising a first and a second insulating substrates which face each other, said first insulating substrate including:

first bus lines formed on a face of said first insulating substrate, the face facing said second insulating substrate;

second bus lines crossing said first bus lines;

a short-circuit line for short-circuiting said first bus lines to said second bus lines, said short-circuit line crossing said first bus lines at end portions thereof and crossing said second bus lines at end portions thereof; and a plurality of elements for electrically connecting said short-circuit line to one of said first bus lines and said second bus lines, said elements being respectively formed at said crossings of said short-circuit line and said first bus lines and at said crossings of said short-circuit line and said second bus lines, wherein each of said elements includes: part of a corresponding one of said end portions of said first bus lines or part of a corresponding one of said end portions of said second bus lines; a corresponding part of said short-circuit line; and an insulating thin film formed between said short-circuit line and said corresponding one of said end portions of said first bus lines or said corresponding one of said end portion of said second bus lines, and wherein said insulating thin film is an oxide film formed by anodizing said corresponding one of said end portions of said first bus line or said corresponding one of said end portions of said second bus lines.

2. An active matrix type liquid crystal display panel according to claim 1, wherein said end portions of said second bus lines are made of the same material as that of said first bus lines, and remaining portions of said second bus lines other than said end portions thereof are made of the same material as that of said short-circuit line.

3. An active matrix type liquid crystal display panel according to claim 2, wherein said end portions of said second bus lines are formed simultaneously with the formation of said first bus lines, and remaining portions of said second bus lines other than said end portions thereof are formed simultaneously with the formation of said short-circuit line.

4. An active matrix type liquid crystal display panel according to claim 2, wherein said first bus lines and said end portions of said second bus lines are made of Ta or Al.

5. An active matrix type liquid crystal display panel according to claim 1, wherein the remaining portions of said second bus lines other than said end portions thereof and said short-circuit line are made of Ti or Cr.

6. An active matrix type liquid crystal display panel according to claim 1, wherein said first bus lines and said second bus lines are formed of metal.

7. An active matrix type liquid crystal display panel comprising a first and a second insulating substrates which face each other, said first insulating substrate including:

first bus lines formed on a face of said first insulating substrate, the face facing said second insulating substrate;

second bus lines crossing said first bus lines;

a short-circuit line for short-circuiting said first bus lines to said second bus lines, said short-circuit line crossing said first bus lines at end portions thereof and crossing said second bus lines at end portions thereof; and a plurality of elements for electrically connecting said short-circuit line to one of said first bus lines and said second bus lines, said elements being respectively formed at said crossings of said short-circuit line and said first bus lines and at said crossings of said short-circuit line and said second bus lines, wherein each of said elements includes: part of a corresponding one of said end portions of said first bus lines or part of a corresponding one of said end portions of said second bus lines; a corresponding part of said short-circuit line; and an insulating thin film formed between said short-circuit line and said corresponding one of said end portions of said first bus lines or said corresponding one of said end portion of said second bus lines, and wherein said short-circuit line has a first portion parallel to said first bus lines and a second portion parallel to said second bus lines, and said insulating thin film is an oxide film formed by anodizing a surface of said corresponding one of said end portions of said first bus line or a surface of said first portion of said short-circuit line.

8. An active matrix type liquid crystal display panel according to claim 7, wherein said first portion of said short-circuit line is made of the same material as that of said first bus lines, and second portion of said short-circuit line is made of the same material as that of said second bus lines, and wherein said second portion of said short-circuit line and said second bus lines are provided on said first portion of said short-circuit line and said first bus lines.

9. An active matrix type liquid crystal display panel according to claim 8, wherein said first bus lines and said first portion of said short-circuit line are made of Ta or Al.

10. An active matrix type liquid crystal display panel according to claim 8, wherein said second bus lines and said second portion of said short-circuit line are made of Ti or Cr.

11. A method for producing an active matrix type liquid crystal display panel comprising a first and a second insulating substrates which face each other, said method comprising a process for producing said first insulating substrate, said process including the steps of:

forming first bus lines on a face of said first insulating substrate, the face facing said second insulating substrate;

forming second bus lines crossing said first bus lines, said second bus lines being electrically insulated from said first bus lines; and forming a short-circuit line for short-circuiting said first bus lines to said second bus lines, said short-circuit line crossing said first bus lines in end portions thereof and crossing said second bus lines in end portions thereof, wherein said step of forming a short-circuit line includes a step of forming elements by forming insulating thin films on said end portions of said first bus lines and on said end portions of said second bus lines and by forming said short-circuit line to cover said insulating thin films, each of said elements including part of corresponding one of said end portions of said first bus lines or part of a corresponding one of said end portions of said second bus lines; a corresponding part of said short-circuit line; and a corresponding one of said insulating thin films, and wherein said step for forming elements includes a step of anodizing surfaces of said end portions of said first bus line or surfaces of said end portions of said second bus lines, thereby forming said insulating thin films.

12. A method for producing an active matrix type liquid crystal display panel according to claim 11, wherein said step of forming second bus lines includes a step of forming said end portions of said second bus lines of the same material as that of said first bus lines.

13. A method for producing an active matrix type liquid crystal display panel according to claim 11, wherein said first bus lines and said end portions of said second bus lines are made of Ta or Al.

14. A method for producing an active matrix type liquid crystal display panel according to claim 12, wherein said short-circuit line is made of the same material as that of remaining portions of said second bus lines other than said end portions thereof.

15. A method for producing an active matrix type liquid crystal display panel according to claim 14, wherein said short-circuit line and the remaining portions of said second bus lines other than said end portions thereof are made of Ti or Cr.

16. An active matrix type liquid crystal display panel according to claim 11, wherein said first bus lines and said second bus lines are formed of metal.

17. A method for producing an active matrix type liquid crystal display panel according to claim 12, wherein said step of forming second bus lines includes a step of forming said end portions of said second bus lines simultaneously with the formation of said first bus lines.

18. A method for producing an active matrix type liquid crystal display panel comprising a first and a second insulating substrates which face each other, said method comprising a process for producing said first insulating substrate, said process including the steps of:

forming first parallel lines including first bus lines and a first short-circuit line on a face of said first insulating substrate, the face facing said second insulting substrate;

forming insulating thin films on said first lines by anodizing surfaces of said first lines; and forming second parallel lines including second bus lines and a second short-circuit line on said insulating thin films, said second lines crossing said first lines.

19. A method for producing an active matrix type display panel, comprising the steps of:

forming a plurality of one of scanning lines and signal lines, and forming at least an end portion for each of a plurality of the other of said scanning lines and said signal lines;

forming an insulating film on at least a part of each of said plurality of one of said scanning lines and said signal lines and each of said end portions of the other of said scanning lines and said signal lines by anodization; and forming a short-circuit line on said insulating film on each of said parts while forming a remaining portion of each of said plurality of the other of said scanning lines and said signal lines.

20. An active matrix type liquid crystal display panel according to claim 19, wherein said first bus lines and said second bus lines are formed of metal.

* * * * *